United States Patent [19]

Bohner et al.

[11] Patent Number: 6,076,626
[45] Date of Patent: Jun. 20, 2000

[54] STEERING SYSTEM FOR MULTI-TRACK MOTOR VEHICLES

[75] Inventors: Hubert Bohner, Böblingen; Martin Moser, Fellbach, both of Germany

[73] Assignee: DaimlerChrysler AG, Germany

[21] Appl. No.: 08/801,865

[22] Filed: Feb. 18, 1997

[30] Foreign Application Priority Data

Feb. 15, 1996 [DE] Germany .......................... 196 05 553

[51] Int. Cl.[7] ................................................... B62D 5/06
[52] U.S. Cl. ...................... 180/402; 180/405; 180/6.26; 701/78
[58] Field of Search ........................ 180/402, 405, 180/406, 407, 6.24, 6.26, 6.28, 6.3; 701/41, 76, 78

[56] References Cited

U.S. PATENT DOCUMENTS 3,603,424  9/1971  Blood et al. .
3,847,243  11/1974  Barth .......................................... 180/405
3,877,537  4/1975  Ohms et al. .
3,893,528  7/1975  Rehfeld ...................................... 180/405

FOREIGN PATENT DOCUMENTS

| 314 641 A2 | 5/1989 | European Pat. Off. . |
| 714334 | 12/1941 | Germany . |
| 2120745 | 4/1971 | Germany . |
| 4123234 C1 | 8/1992 | Germany . |
| 4232256 A1 | 4/1993 | Germany . |
| 4207719 A1 | 9/1993 | Germany . |
| 4302670 A1 | 8/1994 | Germany . |
| 4438929 C1 | 10/1995 | Germany . |
| 1 290 259 | 4/1970 | United Kingdom . |

*Primary Examiner*—Kevin Hurley
*Attorney, Agent, or Firm*—Evenson, McKeown, Edwards & Lenahan, P.L.L.C.

[57] ABSTRACT

An emergency backup steering system for a wheeled vehicle controls steering of the vehicle upon failure of the primary vehicle steering system, by unequal braking of wheels on opposite sides of the vehicle.

5 Claims, 2 Drawing Sheets

STEERING SYSTEM FOR MULTI-TRACK MOTOR VEHICLES

BACKGROUND AND SUMMARY OF THE INVENTION

The invention relates to steering systems for multitrack wheeled vehicles.

This application claims the priority of German patent application 196 05 553.9, the disclosure of which is expressly incorporated by reference herein.

In conventional steering systems for road vehicles, a steering wheel is positively coupled to the steered vehicle wheels by a mechanical transmission. However, steering systems without mechanical positive coupling of this kind between the steering member and the steered vehicle wheels are now being designed. In relatively simple systems, for example, hydraulic positive coupling is provided between the steering member and the steered vehicle wheels. Moreover, systems are also being developed which are intended to dispense with all positive coupling between the steering member and the steered vehicle wheels. Instead, the steering member actuates a desired-value transmitter which is provided as part of an electronic control path that controls a servo motor. The servo motor actuates the steered vehicle wheels in accordance with a desired value/actual value comparison, and also controls a hand-force adjuster which sets a predeterminable reaction force, generally dependent on the driving state, at the steering member. In this manner, it is possible to control virtually any steering behavior, and in special driving situations it is possible to perform autonomous steering interventions as a function of parameters which are to be evaluated.

In principle, systems of this kind can be designed to be very reliable. Similar systems are already in use, for example, for the actuation of control surfaces on aircraft, the term "fly by wire" having passed into common usage. The reliability of such systems is ensured by multiple redundancy.

It is the object of the present invention to provide an advantageous arrangement for redundancy in such steering systems for vehicles.

This object is achieved according to the invention by providing, in addition to a main steering system that controls the steered vehicle wheels by changing the steering angle, an emergency steering system which can be switched on (or automatically switches itself on) if the main steering system fails, and which controls the steering of the vehicle by actuating wheel brakes on different sides of the vehicle unequally as a function of the actuation of a steering member. The invention is based on the general idea of using electronically controlled brake systems, which are known in principle (and which permit independent control of the braking forces on each wheel to avoid lock-up during braking), to give controllably different distribution of the braking forces between wheels on different sides of the vehicle in order still to permit steering maneuvers, for example a lane change, in emergencies.

In a preferred embodiment of the invention, the steered vehicle wheels have a sufficient steering offset so that it is also possible, by correspondingly different control of the wheel brakes of these wheels, to achieve a change in the steering angle and hence "conventional" steering of these wheels.

Other objects, advantages and novel features of the present invention will become apparent from the following detailed description of the invention when considered in conjunction with the accompanying drawings.

DETAILED DESCRIPTION OF THE DRAWINGS

Figure 1:
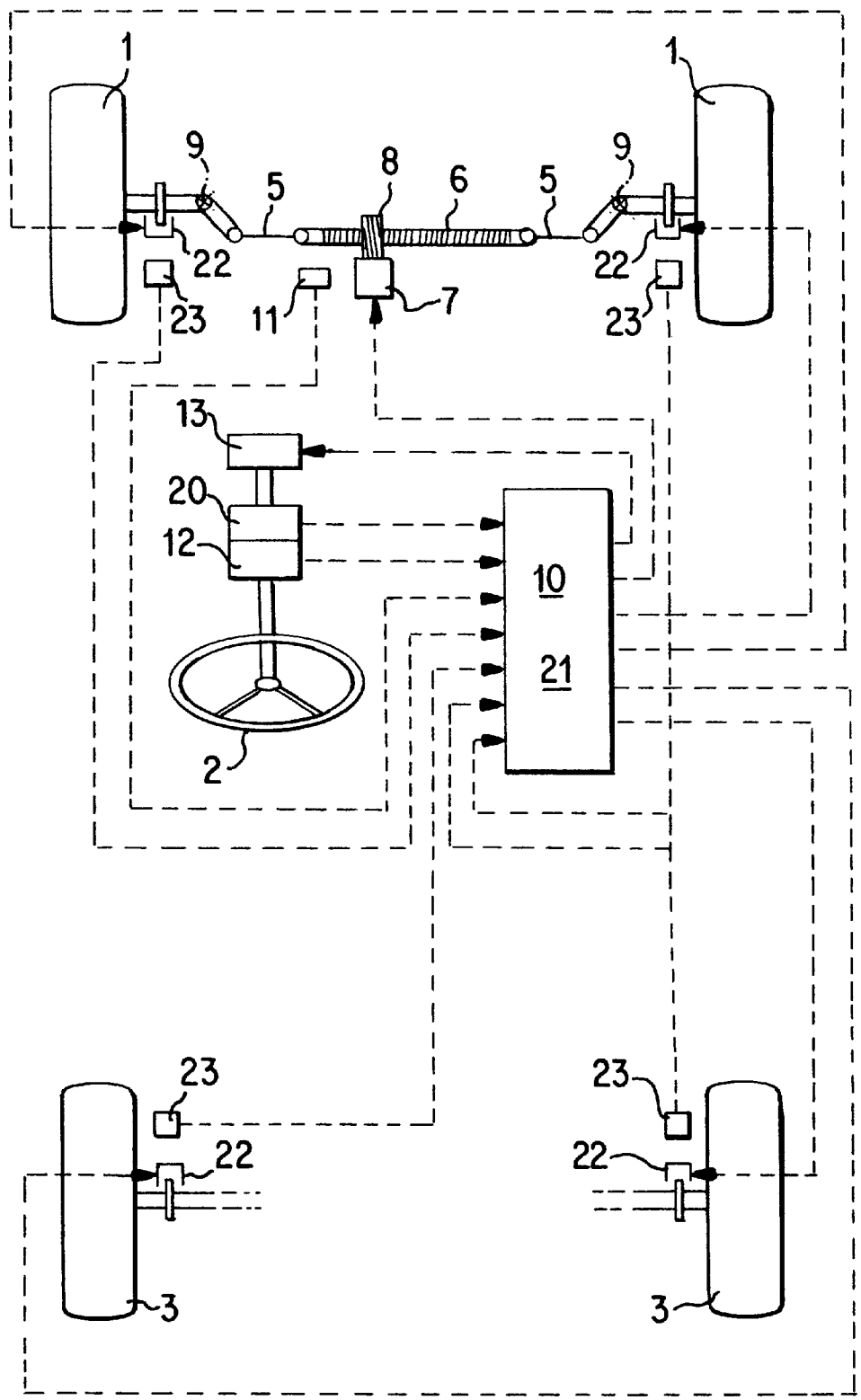
FIG. 1 shows a schematic depiction of a vehicle with a steering system according to the invention.

According to the drawing, the motor vehicle (which is otherwise not shown in detail) has a conventional front axle with steerable front wheels 1, which are actuated in the manner described below by means of a steering wheel 2. In addition, the vehicle has a rear axle with non-steerable rear wheels 3, although, if required, they can also have an additional steering system which can set limited steering angles.

The front wheels 1 are mechanically positively coupled, via track rods 5, to a rack 6 which meshes with a pinion 8 driven by a non-self-locking electric motor 7. Actuation of the electric motor 7 in one or the other direction, causes the rack 6 to be displaced in a corresponding direction, so that the front wheels 1 are deflected accordingly, about essentially vertical steering axes 9. Arranged between the electric motor 7 and the steering wheel 2 is a control path with an electronic controller 10 which has an input connected to an actual-value transmitter 11 that represents the steering angle of the front wheels 1, and another input connected to a desired-value transmitter 12 that is drive-connected to the steering wheel 2. Outputs from the controller 10 control the electric motor 7 and a hand-force adjuster 13 coupled (in terms of drive) to the steering wheel 2 in a known manner, so that an actuating force which varies with the actuating force of the electric motor 7 can be felt at the steering wheel 2.

If this main steering system has a fault or fails, an emergency steering system is activated automatically. Problems with the main steering system can have many causes. One typical cause for example is that the actual value transmitter 11 for the steering angle fails to generate a signal. Another possible cause is that the desired value transmitter 12 associated with the main steering system does not generate a signal for the steering angle. Finally, a case can occur in which the controller 10 of the main steering system fails to operate correctly. Such cases can be detected as the controller, in a manner that is basically known, constantly checks for malfunctions. In addition (at least theoretically) a case can occur in which electric motor 7 does not operate correctly, so that controller 10 cannot operate the steering properly. This is evidenced by the fact that an excessively long period of time elapses until the actual value of the steering angle as determined by actual value transmitter 11 matches the desired value of the steering angle as determined by desired value transmitter 12. If one of these errors is detected (as in position 20 in FIG. 2), the emergency steering system is activated.

For this emergency steering system, the desired-value transmitter 12 and/or a parallel redundant desired-value transmitter 20 pass a signal representing the respective desired value of the steering angle to an input of a braking-force control system 21. An output from the braking-force control system 21 is connected to the wheel brakes 22 of the front and rear wheels 1 and 3 and, in accordance with the desired value of the steering angle, controls these wheel brakes 22 differently on the right-hand and left-hand side of the vehicle. Thus, by differing braking action on the opposite sides of the vehicle, the vehicle tends to travel in a curve.

At the front wheels 1, differences in the strength of actuation at the wheel brakes 22 inevitably lead to steering torques relative to the steering axes 9 since the front wheels 1 are arranged with a relatively large steering offset relative to these steering axes 9, (that is, at a greater radial distance of the rotational plane of the wheels 3 from the abovementioned axes 9). As a result, the one of the front wheels 1 that receives a disproportionately greater braking force experiences a rotational movement about the rotational axis 9, which causes it to pivot. This pivoting action is transmitted by the linkage 5 to the other front wheel 1, which experiences no comparable rotational movement (having received a disproportionately lesser braking force). Therefore, both front wheels 1 pivot accordingly, causing a change in the steering angle of the vehicle.

The braking-force control system 21 continuously receives signals representing the wheel speeds from wheel sensors 23. These signals are evaluated in a known manner to prevent lock-up of the wheels 1 and 3 during braking. During braking, too, the wheels 1 and 3 can thus have only a limited slip, so that the respective curve radius can be calculated from speed differences between the wheels 1 and 3 on the right side of the vehicle and the corresponding wheels on the left side of the vehicle.

Figure 2:
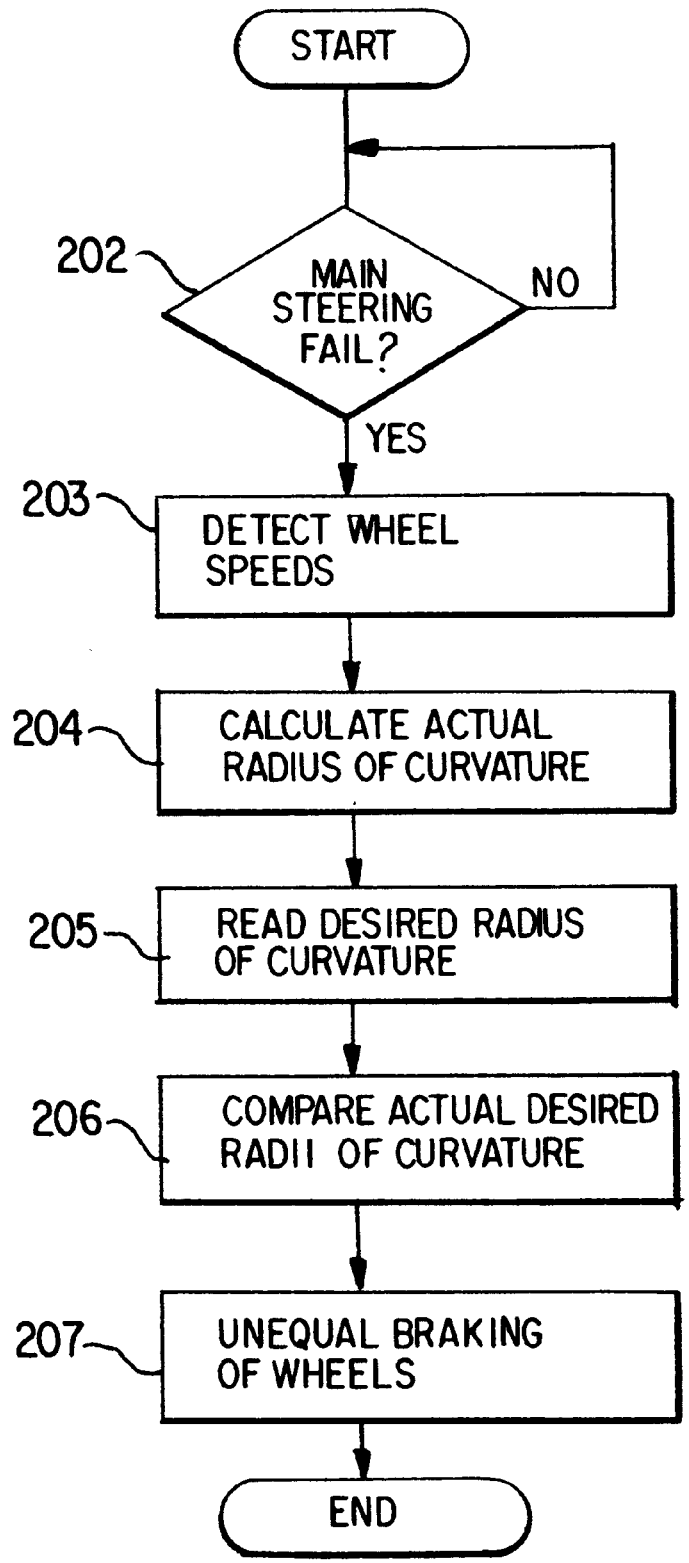
FIG. 2 is a flow diagram which shows processing according to an embodiment of the invention.

According to a preferred embodiment of the invention, provision is made for the braking-force control system 21 to have a computer of sufficient capacity to determine the curve radius. As shown in FIG. 2, upon failure of the main steering system (step 202) this actual value for the curve radius (determined in steps 203, 204) is then compared in step 206 with a corresponding desired value determined in step 205 on the basis of the signals of the desired-value transmitters 12 and 20. If in step 207, the actual and desired radii are found to be equal, processing returns to step 203 (since no differential braking is required), and the process is repeated.

If on the other hand there is a difference between the actual value and the desired value, the wheels on the right side of the vehicle must be braked differently than the wheels on the left side of the vehicle (step 208). In order to set the correct amount of non-uniform braking or to produce a difference between the desired value and the actual value that is vanishingly small, a new interrogation starting at 203 must follow in a non-uniform brake application. This is also true in the case when the difference between the desired value and the actual value is zero; the reason for this is that other disturbing influences theoretically can cause a more or less pronounced difference between the actual value and the desired value of the curve radii at any time.

When the emergency steering system is activated, interrogations 203 to 206 in FIG. 2 are constantly repeated in rapid sequence. In this way the system "knows" whether the wheels on the two sides of the vehicle must be braked differently or not. After interrogation 206 the difference between the desired and actual values of the curve radii is determined. If there is no difference between the desired and actual values (step 207), there will not be any differential brake application on the two sides of the vehicle, and any unbalanced brake application activated previously will be terminated. If on the other hand there is a difference between the desired and actual values in one direction or the other, depending on the direction of this difference, the right-hand or left-hand vehicle wheels will be braked, or the right-hand or left-hand wheels will be braked more strongly than the wheels on the other side (step 208). This process is continued until the malfunction of the main steering system is corrected by servicing the vehicle at a service facility.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. For use in a multi-track wheeled vehicle having a main steering system with a steering member that controls a steering angle of steered wheels of said vehicle, and a braking system which permits independent control of braking forces applied on each wheel, an emergency steering system for steering said vehicle in case of failure of said main steering system, said emergency steering system comprising:

a brake force control unit which actuates wheel brakes on different sides of said vehicle unequally as a function of actuation of said steering member; wherein the steering member of the main steering system actuates at least a desired-value transmitter which is arranged as part of a control path associated with the main steering system, and which actuates a servo motor for the steered vehicle wheels by means of desired value/actual value comparison; and signals of the desired-value transmitter control the wheel brakes during the operation of the emergency steering system.

2. Steering system according to claim 1, further comprising wheel speed sensor units for monitoring wheel speed of each wheel of said vehicle, and wherein:

said braking force control unit calculates an actual radius of curvature for a path of said vehicle as a function of respective wheel speeds of said vehicle wheels and compares said actual radius of curvature with desired value signals of said desired value generator for controlling actuation of said wheel brakes.

3. Steering system according to claim 1 wherein said at least a desired value transmitter comprises first and second desired value transmitters which operate in parallel.

4. For use in a multi-track wheeled vehicle having a main steering system with a steering member that controls a steering angle of steered wheels of said vehicle, and a braking system which permits independent control of braking forces applied on each wheel, an emergency steering system for steering said vehicle in case of failure of said main steering system, said emergency steering system comprising:

a desired value transmitter for generating a signal indicative of a desired value of a steering angle of said vehicle as a function of a position of said steering member; and a braking force control unit which actuates wheel brakes on different sides of said vehicle unequally as a function of said signal from said desired value generator.

5. A multi-track wheeled vehicle having a main steering system with a steering member that controls a steering angle of steered wheels of said vehicle, a braking system which permits independent control of braking forces applied on each wheel, and an emergency steering system for steering said vehicle in case of failure of said main steering system, wherein said emergency steering system comprises:

a desired value transmitter for generating a signal indicative of a desired value of a steering angle of said vehicle as a function of a position of said steering member; and a braking force control unit which actuates wheel brakes on different sides of said vehicle unequally as a function of said signal from said desired value generator.

* * * * *